(12) United States Patent
Zhang

(10) Patent No.: US 11,813,899 B2
(45) Date of Patent: Nov. 14, 2023

(54) LOCKING APPARATUS AND LOCKING METHOD FOR TIRE PRESSURE MONITORING DEVICE

(71) Applicant: HAMATON AUTOMOTIVE TECHNOLOGY CO., LTD, Zhejiang (CN)

(72) Inventor: Jianer Zhang, Zhejiang (CN)

(73) Assignee: HAMATON AUTOMOTIVE TECHNOLOGY CO., LTD

( * ) Notice: Subject to any disclaimer, the term of this patent is extended or adjusted under 35 U.S.C. 154(b) by 347 days.

(21) Appl. No.: 16/490,878

(22) PCT Filed: Jun. 21, 2017

(86) PCT No.: PCT/CN2017/089404
§ 371 (c)(1),
(2) Date: Sep. 3, 2019

(87) PCT Pub. No.: WO2018/157511
PCT Pub. Date: Sep. 7, 2018

(65) Prior Publication Data
US 2020/0009925 A1 Jan. 9, 2020

(30) Foreign Application Priority Data
Mar. 3, 2017 (CN) .......................... 201710124268.X

(51) Int. Cl.
*B60C 23/04* (2006.01)
*G01M 17/02* (2006.01)

(52) U.S. Cl.
CPC ........... *B60C 23/04* (2013.01); *G01M 17/022* (2013.01)

(58) Field of Classification Search
CPC ...... G02B 2027/0118; G02B 2027/012; G02B 6/00; G02B 2027/0187; G02B 27/01;
(Continued)

(56) References Cited

U.S. PATENT DOCUMENTS 5,528,496 A * 6/1996 Brauer ................. G01B 11/275
701/34.2
6,125,904 A * 10/2000 Kane ..................... B60C 25/056
157/1
(Continued)

FOREIGN PATENT DOCUMENTS

CN 101096159 A 1/2008
CN 101169344 A 4/2008
(Continued)

OTHER PUBLICATIONS

International Search Report for Application No. PCT/CN2017/089404, dated Dec. 6, 2017, 3 pages.
(Continued)

*Primary Examiner* — Harshad R Patel
*Assistant Examiner* — Gedeon M Kidanu
(74) *Attorney, Agent, or Firm* — Jaffery Watson Mendonsa & Hamilton LLP

(57) ABSTRACT

A locking apparatus and locking method for a tire pressure monitoring device. The apparatus comprises a base (1); an electrical appliance control module disposed in the base; a feeder, a pushing assembly (6), a shielding box module (7) and a discharging port (8) arranged on the base (1) in an entering-leaving order of the target tire pressure monitoring device to be locked in the locking process, wherein the shielding box module (7) includes a stepping motor, a lower shielding box (7-1) and an upper shielding box (7-2); the stepping motor is connected to the lower shielding box (7-1) by a screw lifting mechanism; a housing (9) matched with the base (1) is arranged at the upper part of the apparatus; the housing (9) is provided with a control computer; the control computer is connected with an industrial control programmable logic controller PLC.

10 Claims, 3 Drawing Sheets

(58) Field of Classification Search
CPC ...... G02B 2027/014; G02B 2027/0138; G01B 21/26; G01B 2210/26; G01B 5/255; G01C 22/02; B29C 2045/2714; B29C 45/2708; B29C 45/30; B29K 2105/0067
See application file for complete search history.

(56) References Cited

U.S. PATENT DOCUMENTS

| | | | |
|---|---|---|---|
| 8,284,390 B1* | 10/2012 | Clasquin | B60C 25/0554 356/139.09 |
| 9,434,219 B1* | 9/2016 | Clasquin | B60C 25/02 |
| 2002/0011103 A1* | 1/2002 | Kimbara | B60C 25/05 73/146 |
| 2004/0255661 A1* | 12/2004 | Nagai | G01M 17/065 73/146 |
| 2005/0104722 A1 | 5/2005 | Tang et al. | |
| 2006/0016258 A1* | 1/2006 | Williams | G01M 1/225 73/462 |
| 2006/0032300 A1* | 2/2006 | Luce | B60C 23/04985 73/146.2 |
| 2006/0086465 A1* | 4/2006 | Munroe | B60C 25/147 157/1.1 |
| 2006/0190212 A1 | 8/2006 | Kobetz | |
| 2009/0078034 A1* | 3/2009 | Range | G01N 27/24 73/146 |
| 2014/0053987 A1* | 2/2014 | Lawson | B60C 25/14 157/1.28 |
| 2015/0210125 A1* | 7/2015 | Yu | B60C 23/0471 340/10.51 |

FOREIGN PATENT DOCUMENTS

| | | | | |
|---|---|---|---|---|
| CN | 101927666 | A | | 12/2010 |
| CN | 102139606 | A | | 8/2011 |
| CN | 102529612 | A | * | 7/2012 ......... B60C 23/0471 |
| CN | 102529612 | A | | 7/2012 |
| CN | 202507862 | U | | 10/2012 |
| CN | 204415057 | U | | 6/2015 |
| CN | 105984287 | A | | 10/2016 |
| CN | 106739863 | A | | 5/2017 |
| CN | 206510699 | U | | 9/2017 |
| DE | 102013200051 | A1 | | 7/2014 |
| EP | 1236588 | A3 | | 7/2003 |

OTHER PUBLICATIONS

Search Report for Application No. 201710124268X, dated Mar. 3, 2017, 2 pages.

* cited by examiner

LOCKING APPARATUS AND LOCKING METHOD FOR TIRE PRESSURE MONITORING DEVICE

CROSS-REFERENCE TO RELATED APPLICATION

The present application claims priority to Chinese patent application No. 201710124268X filed on Mar. 3, 2017, entitled "Locking Apparatus and Locking Method for Tire Pressure Monitoring Device", which is incorporated herein by reference in its entirety.

BACKGROUND

Technical Field

The present disclosure relates to the technical field of tire monitoring and, specifically, to locking apparatus and locking method for a tire pressure monitoring device.

Description of the Related Art

A tire pressure monitoring system (referred as to TPMS) is used to read data such as temperature and pressure of the tire and provide the data to the receiving control system of the vehicle to warn a driver when the pressure of the tire is too low/too high or the temperature thereof is too high, and it is an active vehicle safety device. However, the communication format and operation mode of the RF (transmitter) and LF (receiver) of the tire pressure monitoring system and the receiving control system produced by each manufacturer are different. A communication format and operation mode of RF and LF can only be used in one or several specific models, so in the terms of the repair, maintenance, and modification, inventory and selection problems have arisen due to the large number of vehicle models.

At present, there are various solutions to these problems on the market. One is to store the RF and LF communication formats and operation modes of various vehicle models into a handheld tool or computer through a programmable device, select the vehicle models that need to be replaced, maintained, and modified from the menu of the tool or computer and solve the problem of large inventory of tire pressure monitoring device through field programming; and the other is to store the communication formats and operation modes of multiple RF and LF into a tire pressure monitoring device, wherein the tire pressure monitoring device will operate in a plurality of operation modes, receive a plurality of LF communication formats, and transmit a plurality of RF communication formats, and the receiving control system receives the required communication format to reduce the total number of sensor models.

Although inventories can be reduced to various extents in the technical solutions above, there are still technical and market application defects: since the programming tools used by the programmable devices are written one by one by hand tools or computers, and the communication data formats and operation modes need to be simultaneously programmed, the disadvantages of large amount of data to be programmed, long programming time and low efficiency occur, and since the terminal is in an open state in use, it is susceptible to interference from other factors in the environment and easy to cause program failure and programming error; with respect to the solution of storing the plurality of RF and LF communication formats and operation modes into the tire pressure monitoring device, since the tire pressure monitoring device has limited number of communication data formats and working methods generally stored therein, and some communication data formats and operation modes may interfere with each other and cannot be compatible, with more and more the tire pressure monitoring devices in different formats, the models are still too large, and it is difficult to fundamentally solve problems of numerous inventory models. Moreover, the monitoring device needs to operate in different operation modes, receive different communication models, and send a plurality of communication signals, and thus the power consumption of the sensor battery is increased, thereby shortening the service life of the sensor.

Further, for the group customers, because the professional 4S stores of the group needs to use the tire pressure monitoring device for the special model maintenance of the 4S stores instead of a programmable solution for all models, especially the programmable solution is easily interfered and the system has the characteristic of requiring the matching of the tools, a database and a website, it is time-consuming and the cost is increased for 4S stores, which is unpopular. Moreover, the multi-protocol tire pressure monitoring device still has a large number of inventory problems. Therefore, one of the existing technical problems to be solved is how to provide a locking apparatus for the tire pressure monitoring device to meet market demand.

BRIEF SUMMARY

In order to solve the technical problem above, an aspect of the present disclosure provides a locking apparatus for a tire pressure monitoring device, comprising: a base; an electrical appliance control module disposed in the base;
a feeder, a pushing assembly, a shielding box module and a discharging port arranged on the base in an entering-leaving order of the target tire pressure monitoring device to be locked in the locking process, wherein the shielding box module includes a stepping motor, a lower shielding box and an upper shielding box; the stepping motor is connected to the lower shielding box by a screw lifting mechanism; a housing matched with the base is arranged at the upper part of the apparatus; the housing is provided with a control computer; the control computer is connected with an industrial control programmable logic controller PLC;
the PLC is configured to issue selection prompt information of a lock mode and a vehicle model agreement to the user through the main interface of the control computer and lock the target tire pressure monitoring device according to the lock mode and the vehicle model agreement selected by the user.

In embodiments of the present disclosure, the base is provided with a power supply access port and a plurality of transformers;
the power supply access port is configured to connect an external power source; and the plurality of transformers are configured to convert voltages of the external power source, respectively.

In embodiments of the present disclosure, the base is further provided with a power supply protection switch.

In embodiments of the present disclosure, the housing is provided with an emergency stop button for controlling the apparatus to stop in an emergency.

In embodiments of the present disclosure, the control computer includes a touch input computer that supports a liquid crystal display.

In embodiments of the present disclosure, the housing is further provided with an indicator light and an activation/reset button.

In embodiments of the present disclosure, the apparatus further includes a storage conveyor matched with the feeder and the housing;

wherein the storage conveyor is configured to store and transport the target tire pressure monitoring device with a packaging box.

In embodiments of the present disclosure, the apparatus further includes a printer interface for printing files by the control computer.

In embodiments of the present disclosure, the apparatus has the weight of less than 30 kg.

In another aspect, the present disclosure provides a locking method based on any of above-described locking apparatus for the tire pressure monitoring device, comprising:

issuing selection prompt information of a lock mode and a vehicle model agreement to the user through the main interface of the control computer when the locking apparatus for the tire pressure monitoring device detects that the external power supply is connected and the start button of the electric appliance control module is pressed;

inserting a storage conveyor into a preset position when it is detected that the locking mode selected by the user is a first preset mode, wherein the storage conveyor stores the target tire pressure monitoring device with the packaging box;

conveying the target tire pressure monitoring device to the preset position by the storage conveyor through a feeder; starting a stepping motor of a pushing assembly to operate, and conveying the target tire pressure monitoring device with the packaging box to a preset position of the lower shielding box by the pushing assembly when an optical fiber sensor detects that the target tire pressure monitoring device reaches the preset position; triggering the stepping motors of the lower shielding box and the upper shielding box to operate when the fiber optic sensor detects that the target tire pressure monitoring device reaches the preset position; lifting the lower shielding box by the stepping motors through a screw lifting mechanism to close the lower shielding box and the upper shielding box; triggering a locking module to lock the target tire pressure monitoring device when a pressure sensor in the target tire pressure monitoring device detects the closing force generated by closing; issuing a LF locking program command of the corresponding vehicle model by the locking module according to the locking mode and the vehicle model, and controlling the computer to confirm that the locking program is completed and starting the lower shielding box to perform resetting by the stepping motor when completion signals of the locking program issued by the target tire pressure monitoring device are received; after the optical fiber sensor detects the reset of the lower shielding box, starting the pushing assembly to push the next target tire pressure monitoring device into the preset position of the lower shielding box and push the locked target tire pressure monitoring device to the discharging port;

issuing, by the locking module, the coding program of the corresponding vehicle model when it is detected that the lock mode selected by the user is a second preset mode, and starting the lower shielding box to perform resetting by the stepping motor after the locking module receives the activation enable completion signals issued by the target tire pressure monitoring device, and conveying the target tire pressure monitoring device to a charging basket; starting the target vehicle when it is detected that an unlocked target tire pressure monitoring device is mounted into the tire; activating the target tire pressure monitoring device when an acceleration sensor on the target vehicle detects the rotation of the tires of the vehicle; and triggering the target tire pressure monitoring device to be locked when the pressure sensor detects the tire pressure.

According to the locking apparatus and locking method for the tire pressure monitoring device of the present disclosure, the locking of the locking apparatus for various types of tire pressure monitoring device can be achieved by disposing the electrical appliance control module in the base and arranging the feeder, the pushing assembly, the shielding box module and the discharging port on the base in an entering-leaving order of the target tire pressure monitoring device to be locked in the locking process, arranging a housing at the upper part of the apparatus and providing the control computer on the housing and connecting the control computer with the industrial control programmable logic controller PLC, which can be applied to the locking requirements of tire pressure monitoring device of different vehicle models to meet the needs of various customers.

BRIEF DESCRIPTION OF THE DRAWINGS

In order to more clearly illustrate technical solutions disclosed in the embodiments of the present disclosure or the prior art, the drawings in the descriptions of the embodiments or the prior art will be briefly described below. Obviously, the drawings in the following description are only certain embodiments of the present disclosure, and other drawings can be obtained according to the drawings without any creative labors for those skilled in the art.

DETAILED DESCRIPTION

In order to make the object, technical solutions and advantages of the embodiments of the present disclosure more clear, the technical solutions in the embodiments of the present disclosure will be clearly and completely described in the following with reference to the accompanying drawings in the embodiments of the present disclosure. Obviously, these embodiments are a part of the embodiments of the present disclosure, and not all of the embodiments. All other embodiments obtained by a person of ordinary skill in the art based on the embodiments of the present disclosure without any creative labors belong to the scope of the present disclosure.

Figure 1:
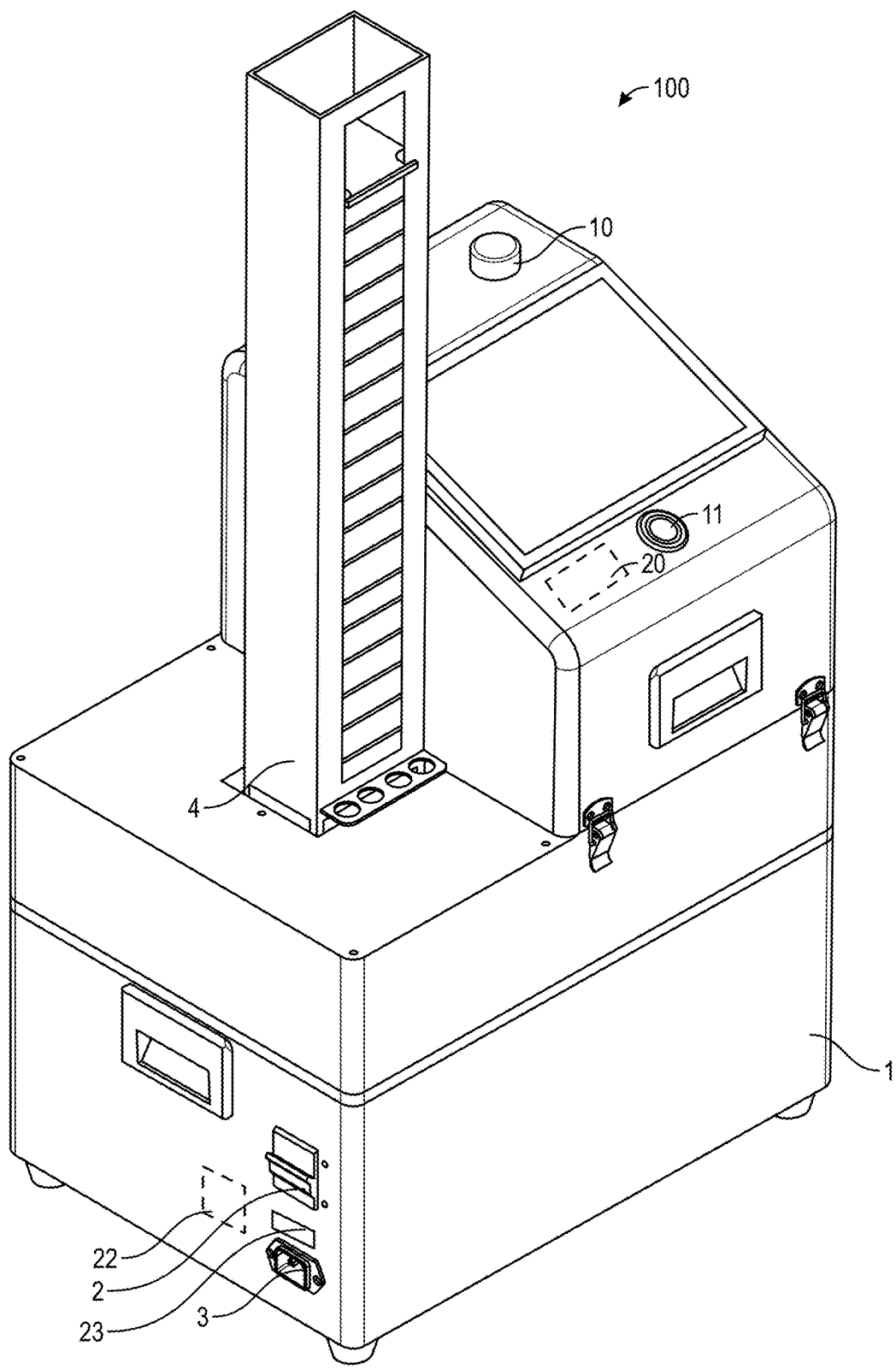
FIG. 1 is a schematic view showing the structure of a locking apparatus for a tire pressure monitoring device according to an embodiment of the present disclosure.
Figure 2:
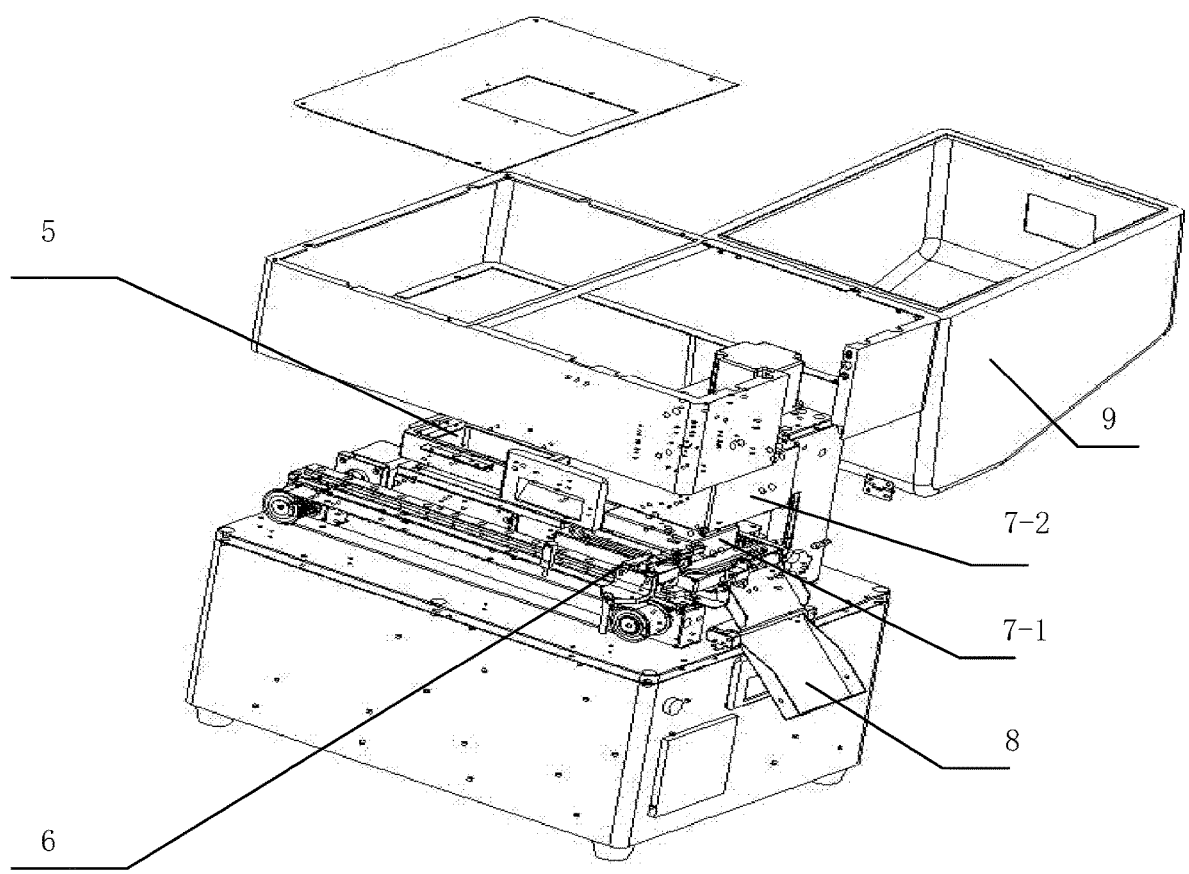
FIG. 2 is a schematic view showing the internal structure of a locking apparatus for a tire pressure monitoring device according to an embodiment of the present disclosure.

FIG. 1 is a schematic view showing the structure of a locking apparatus 100 for a tire pressure monitoring device according to an embodiment of the present disclosure. As shown in FIG. 1, the apparatus comprises a base 1; an electrical appliance control module (including a power supply conversion switch 2, a power supply access port 3) disposed in the base 1;

specifically, FIG. 2 is a schematic view showing the internal structure of a locking apparatus for a tire pressure monitoring device according to an embodiment of the present disclosure. As shown in FIGS. 1 and 2, a feeder (including a charging box 4 and a feeding port 5), a pushing assembly 6, a shielding box module 7 and a discharging port 8 are arranged on the base 1 in an entering-leaving order of the target tire pressure monitoring device to be locked in the locking process, wherein the shielding box module 7 includes a stepping motor (not shown), a lower shielding box 7-1 and an upper shielding box 7-2; the stepping motor is connected to the lower shielding box by a screw lifting mechanism; a housing 9 matched with the base 1 is arranged at the upper part of the apparatus; a control computer (not shown) is disposed on the housing; the control computer is connected with an industrial control programmable logic controller PLC 20;

the PLC is configured to issue the selection prompt information of a lock mode and a vehicle model agreement to the user through the main interface of the control computer and lock the target tire pressure monitoring device according to the lock mode and the vehicle model agreement selected by the user.

In embodiments of the present disclosure, the base is provided with a power supply access port and a plurality of transformers;

the power supply access port 3 is configured to connect an external power source;

and the plurality of transformers 22 are configured to convert voltages of the external power source, respectively.

As preferred embodiments of the present disclosure, the base 1 is further provided with a power supply protection switch 23.

As shown in FIG. 1, further, as preferred embodiments of the present disclosure, the housing is provided with an emergency stop button 10 for controlling the apparatus to perform an emergency stop.

Further, as preferred embodiments of the present disclosure, the control computer includes a touch input computer that supports a liquid crystal display.

Further, as preferred embodiments of the present disclosure, the housing is further provided with an indicator light and an activation/reset button 11.

As shown in FIG. 2, on the basis of the embodiments above, the apparatus further includes a storage conveyor matched with the feeder and the housing 9;

the storage conveyor is configured to store and transport the target tire pressure monitoring device with a packaging box.

Further, as preferred embodiments of the present disclosure, the apparatus further includes a printer interface for printing files by the control computer.

As preferred embodiments of the present disclosure, the apparatus has the weight of less than 30 kg.

The locking apparatus for the tire pressure monitoring device of the present embodiment can realize the locking of the locking apparatus for various types of tire pressure monitoring device by disposing an electrical appliance control module in the base and arranging a feeder, a pushing assembly, a shielding box module and a discharging port on the base in an entering-leaving order of the target tire pressure monitoring device to be locked in the locking process, arranging a housing at the upper part of the apparatus and disposing a control computer on the housing and connecting the control computer with an industrial control programmable logic controller PLC, and can be applied to locking requirements of tire pressure monitoring device of different vehicle models to meet the needs of different types of customers.

In another aspect, the present disclosure provides a locking method based on any of above-described locking apparatus for the tire pressure monitoring device, comprising:

issuing selection prompt information of a lock mode and a vehicle model agreement to the user through the main interface of the control computer when the locking apparatus for the tire pressure monitoring device detects that the external power supply is connected and the start button of the electric appliance control module is pressed;

inserting a storage conveyor into a preset position when it is detected that the locking mode selected by the user is a first preset mode, wherein the storage conveyor stores the target tire pressure monitoring device with the packaging box;

conveying the target tire pressure monitoring device to the preset position by the storage conveyor through a feeder; starting a stepping motor of a pushing assembly to operate, and conveying the target tire pressure monitoring device with the packaging box to a preset position of the lower shielding box by the pushing assembly when an optical fiber sensor detects that the target tire pressure monitoring device reaches the preset position; triggering the stepping motors of the lower shielding box and the upper shielding box to operate when the fiber optic sensor detects that the target tire pressure monitoring device reaches the preset position; lifting the lower shielding box by the stepping motors through a screw lifting mechanism to close the lower shielding box and the upper shielding box; triggering a locking module to lock the target tire pressure monitoring device when a pressure sensor in the target tire pressure monitoring device detects the closing force generated by closing; issuing a LF locking program command of the corresponding vehicle model by the locking module according to the locking mode and the vehicle model, and controlling the computer to confirm that the locking program is completed and starting the lower shielding box to perform resetting by the stepping motor when completion signals of the locking program issued by the target tire pressure monitoring device are received; after the optical fiber sensor detects the reset of the lower shielding box, starting the pushing assembly to push the next target tire pressure monitoring device into the preset position of the lower shielding box and push the locked target tire pressure monitoring device to the discharging port;

issuing, by the locking module, the coding program of the corresponding vehicle model when it is detected that the lock mode selected by the user is a second preset mode, and starting the lower shielding box to perform resetting by the stepping motor after the locking module receives the activation enable completion signals issued by the target tire pressure monitoring device, and conveying the target tire pressure monitoring device to a charging basket; starting the target vehicle when it is detected that an unlocked target tire pressure monitoring device is mounted into the tire; activating the target tire pressure monitoring device when an acceleration sensor on the target vehicle detects the rotation of the tires of the vehicle; and triggering the target tire pressure monitoring device to be locked when the pressure sensor detects the tire pressure.

It should be noted that the embodiment may be an embodiment of a method for continuously locking a plurality of tire pressure monitoring devices corresponding to the locking apparatus embodiment of the tire pressure monitoring device.

Specifically, through the locking apparatus for the tire pressure monitoring device provided in the embodiment, continuous and automatic enablement of the apparatus for locking the vehicle model coding program, the RF and LF transmission programs in the tire pressure detecting device can be realized.

As an alternative embodiment of the present disclosure, the apparatus can automatically lock the tire pressure detecting device with a packaging box.

Figure 3:
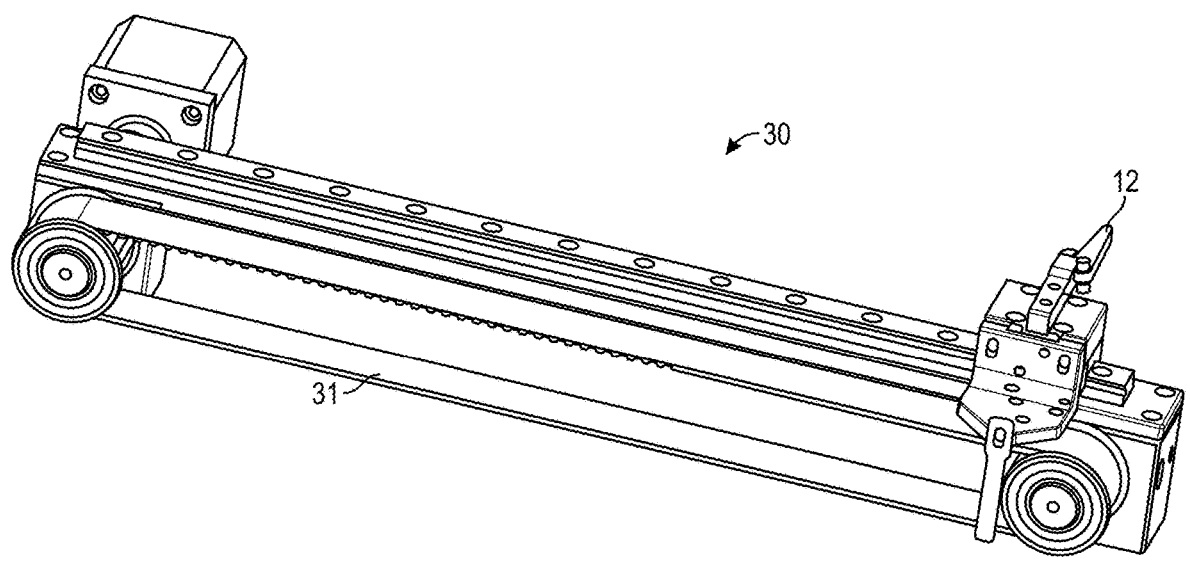
FIG. 3 is a schematic view showing the structure of a pushing assembly of a locking apparatus for a tire pressure monitoring device according to an embodiment of the present disclosure.

FIG. 3 is a schematic view showing the structure of a pushing assembly of a locking apparatus for a tire pressure monitoring device according to an embodiment of the present disclosure. As shown in FIG. 3, the locking apparatus for the tire pressure monitoring device according to an embodiment of the present disclosure has a storage conveyor 30 (including a synchronous belt 31), which has the inner diameter matched with that of the packaging box, and can be configured to store a plurality of tire pressure detecting devices with packaging boxes.

The lower part of the storage conveyor is matched with the feeding port and can be easily inserted and removed for easy insertion into the tire pressure monitoring device and quick insertion into the feeding port after being loaded.

Preferably, the storage conveyor is made of a transparent material to facilitate observation of the conveying condition.

Specifically, the storage conveyor conveys the tire pressure monitoring device using the self-weight of the tire pressure monitoring device with the packaging boxes and a counter weight block, wherein the counter weight block is matched with the inner diameter of the storage conveyor and connected to a top cover of the storage conveyor, and connected with the top cover using a chain having the same length as the height of the conveyor so that the counter weight block is avoided to be dropped into the feeding port when the last tire pressure detecting device is input.

Further, as a preferred embodiment of the present disclosure, the locking apparatus for the tire pressure monitoring device is further provided with a charging port and a conveying track, and the charging port is equipped with an optical fiber sensor (located on the side of the conveyor belt). When the storage conveyor transports the tire pressure monitoring device in place, the optical fiber sensor monitors that the tire pressure monitoring device is in place and notifies the pushing module of operation, and the charging port, the conveying track and the opened lower shielding box form the same plane conveying surface and track;

as shown in FIG. 3, as a preferred embodiment of the present disclosure, the pushing module is composed of a stepping motor, a movable track frame, a drive wheel (including a main drive wheel, a driven wheel), a synchronous belt 11, and a pushing rod 12. The optical fiber sensor monitors that the tire pressure monitoring device is in place, notifies the controller (a computer) to start the stepping motor to operate, and the stepping motor drives the synchronous main drive wheel. The main drive wheel drives the driven wheel using the synchronous belt, and the driven wheel pulls the pushing rod through the track to convey the tire pressure monitoring device with packaging boxes to a preset position of the lower shielding box through the conveyor and the track and simultaneously, the started and locked tire pressure monitoring device is pushed out of the lower shielding box to the discharging port using the conveyed tire pressure monitoring device. The optical fiber sensor notifies the controller when it detects that the tire pressure detecting device reaches the preset position of the lower shielding box. The computer controller notifies the pushing module that the stepping motors move counterclockwise, and the pushing rod is retracted back to the preset position. The pushing module has a pushing device for pushing the tire pressure monitoring device to the preset position. The pushing device has a movable pushing rod that will be automatically bent into 90 degrees when it is returned to meet the tire pressure monitoring device at the inlet, so as not to be blocked by the tire pressure monitoring device, and is reset by a spring mounted in the pushing rod and the pushing rod seat after it is retracted to the preset position.

Further, as a preferred embodiment of the present disclosure, the locking apparatus for the tire pressure monitoring device is further provided with an upper and a lower shielding boxes (such as a metal shielding box which can be opened and closed, and in which electromagnetic shielding lines are disposed), wherein the lower shielding box forms the same plane with the conveying surface after being opened, and a conveying track is arranged on the plane, forming the same track with the track on the conveying surface; the lower shielding box is installed with an optical fiber sensor, and is combined with another stepping motor (stepping motor for the conveying track), an active locking system in which the tire pressure monitoring device is installed in the upper shielding box includes a circuit board, and the circuit board is provided with a processor, a memory, a transmitter and a receiver, the memory has stored therein a encoding program and RF, LF transmission program for all modes available in the market, and a locking program for the special tire pressure monitoring device and an enablement locking operation program for the special tire pressure monitoring device; the circuit board is in wired connection with an electric control box power supply, and works at a voltage of 12V; the circuit board is in wired connection with the controller (computer) to receive various commands of the controller (computer) and return relevant operation result information.

Further, when the pushing rod pushes the tire pressure monitoring device with the packaging boxes into the preset position of the lower shielding box through the conveying plane along the track, the optical fiber sensor monitors that the tire pressure monitoring device is conveyed in place and notifies the controller (computer); the controller (computer) notifies the stepping motors to start, and the stepping motor lifts the lower shielding box through the screw lifting mechanism to be closed with the upper shielding box. When closed, it is notified by the pressure sensor that the controller is closed and shielded, the controller (computer) transmits the set OE_R mode (first preset mode) and vehicle model command to the tire pressure detecting device installed in the shielding box to enable and activate the locking system, and simultaneously commands the tire pressure detecting device to enable and activate the locking system to operate, the system issues the LF transmission program of the vehicle model according to the mode and vehicle mode command transmitted by the controller (computer), the LF transmission program enters the memory of the tire pressure detecting device, the vehicle model encoding program with the same LF code and transmission program set are searched for in the memory, and the set of codes are activated and enabled after being found, RF program is transmitted after the activated and enabled group of codes are received; after receiving the RF program, the enablement activation locking system for the tire pressure detecting device in the shielding box issues a special locking program; after receiving the locking program, the tire pressure monitoring device starts the locking program preset in the tire pressure monitoring device and the locking tire pressure monitoring device no longer accepts any external activation enablement program; the tire pressure monitoring device can only use a set of encoding programs and transmission programs that have been activated and enabled to complete the matching with the particular vehicle model; the PLC opens the shielding box and positions, and the controller notifies the conveying device to convey the next tire pressure monitoring device.

Further, the controller may have two mode selections. When the HYBRID is selected, the tire pressure monitoring device enables and activates the locking system after activating and enabling the encoding and transmission programs, and the tire pressure monitoring device issues an RF program code and the tire pressure monitoring device enables and activates the lock system to receive the RF program code, that is, to open the shielding box. The lower shielding box is reset (opened), the controller (computer) notifies the conveying device to feed the next tire pressure monitoring device, and the unlocked tire pressure monitoring device is locked after it is loaded into the tire by enabling the pressure lock program.

Further, the apparatus uses one controller (computer) as the overall controller of the device, the Microsoft system as the operating system, and the computer as a touch-type LCD screen, and the commands and programs can be input by hand, and the locking system can be activated by the wired connection of the industrial control PLC and the tire pressure monitoring, and the PLC has a memory in which the apparatus operation control software is stored.

Compared with the prior art, the present disclosure solves the locking problem of the tire pressure monitoring device; if the tire pressure monitoring device is not locked, it is possible to activate and enable a plurality of encoding programs and transmission programs in the tire pressure monitoring device, thereby invalidating the tire pressure monitoring device. Therefore, two sets of locking programs (corresponding to the above two operating modes) are set in the tire pressure monitoring device of the present disclosure, one group issues a locking program by the apparatus when the specific encoding program and the transmission program are activated and enabled, instructs the tire pressure detecting device to enable a preset locking program, and locks the tire pressure monitoring device to no longer receive any enablement and activation signal. In order to allow the user to manually activate and enable the apparatus to prevent mistakes, the tire pressure monitoring device is activated by an acceleration sensor after the tire pressure monitoring device is mounted on the tire for the first time, and after the pressure sensor in the tire pressure monitoring device receives the tire pressure, the preset locking program is enabled by the tire pressure, the tire pressure monitoring device is instructed to no longer receive various enablement signals, such that tire pressure monitoring device guarantees that only one correct set of encoding and transmission programs is activated and enabled;

further, the present disclosure solves the problem that the group needs to concentrate on purchasing a large number of tire pressure monitoring devices for various vehicle models to repair and modify the tire pressure detecting device since the group sells and serves a plurality of models and the demand for the sales service terminal of the group is a single vehicle model; the tire pressure detecting devices in the Background are one-to-one products for specialized vehicle models and these products also provide terminal repair and modification services, but since these terminals belong to the automobile dealership group and the group operates hundreds of vehicle models from dozens of auto factories, if the group purchases hundreds of kinds of tire pressure monitoring devices, firstly, after the dispersion, the batch is small, and there is no bargaining power, and secondly, the usage amount cannot be determined, which is easy to cause inventory backlog, and at the same time, it is difficult to manage due to numerous models.

Through the locking apparatus for the tire pressure monitoring device provided by the disclosure, the reduction in both cost and inventory can be realized, and at the same time, the problem that the tire pressure monitoring device storing all the commercially available vehicle models needs to be converted into tire pressure monitoring device for specific vehicle models after being purchased by the Group according to the needs of each terminal store is solved; the apparatus is small in size and easy to carry, and can be placed in various transfer stations, regional warehouses, regional center stores and other sub-channel centers, which can quickly and easily meet the needs of small orders of various terminal stores and solve the demand for specialized terminal stores and group forwarding after mass purchase.

On this basis, the present disclosure also considers that initial use of the apparatus may cause input errors and other special requirements. Therefore, the hybrid mode is also set, which is not locked in the field after being enabled and activated, but is locked using the tire pressure lock to avoid the problem of error correction.

It should be noted that the present disclosure is also applicable to the activation and enablement of the tire pressure monitoring device using a hand tool, which can also meet the needs of the terminal store facing all vehicle models.

The embodiments above are only used to explain the technical solutions of the present disclosure, and are not limited thereto; although the present disclosure is described in detail with reference to the foregoing embodiments, it should be understood by those skilled in the art that they can still modify the technical solutions described in the foregoing embodiments and make equivalent replacements to a part of the technical features; these modifications or substitutions do not depart from the spirit and scope of the technical solutions of the embodiments of the present disclosure.

The invention claimed is:

1. A locking apparatus for a target tire pressure monitoring device, comprising:
   a base;
   an electrical appliance control module disposed in the base;
   a feeder, a pushing assembly, a shielding box module and a discharging port arranged on the base in an entry/exit sequence of the target tire pressure monitoring device that is locked in a locking process, wherein the shielding box module includes a stepping motor, a lower shielding box and an upper shielding box; the stepping motor is connected to the lower shielding box by a screw lifting mechanism;

a housing matched with the base is arranged at the upper part of the locking apparatus;

the housing is provided with a control computer; the control computer is connected with an industrial control programmable logic controller (PLC);

the PLC is configured to issue selection prompt information of a lock mode and a vehicle model agreement to a user through a main interface of the control computer with a first preset mode to convey the target tire pressure monitoring device in a preset position in the lower shield box when a sensor detects that the target tire pressure monitoring device reaches the preset position and a second preset mode to lock the target tire pressure monitoring device to not accept any external activation enablement program according to the lock mode and the vehicle model agreement selected by the user.

2. The apparatus of claim 1, wherein the base is provided with a power supply access port and a plurality of transformers; the power supply access port is configured to connect an external power source; and the plurality of transformers are configured to convert voltages of the external power source, respectively.

3. The apparatus of claim 1, wherein the base is further provided with a power supply protection switch.

4. The apparatus of claim 1, wherein the housing is provided with an emergency stop button for controlling the apparatus to stop in an emergency.

5. The apparatus of claim 1, wherein the control computer includes a touch input computer that supports a liquid crystal display.

6. The apparatus of claim 1, wherein the housing is further provided with an indicator light and an activation/reset button.

7. The apparatus of claim 1, further comprising:

a storage conveyor matched with the feeder and the housing; wherein the storage conveyor is configured to store and transport the target tire pressure monitoring device with a packaging box.

8. The apparatus of claim 7, further comprising:

a printer interface for printing files by the control computer.

9. The apparatus of claim 8, wherein the apparatus has a weight of less than 30 kg.

10. The locking apparatus for the tire pressure monitoring device according to claim 1, comprising:

issuing selection prompt information of the lock mode and the vehicle model agreement to the user through the main interface of the control computer when the locking apparatus for the tire pressure monitoring device detects that an external power source is connected and a start button of the electrical appliance control module is pressed;

inserting a storage conveyor into a preset position when it is detected that the locking mode selected by the user is the first preset mode, wherein the storage conveyor stores the target tire pressure monitoring device with a packaging box;

conveying the target tire pressure monitoring device to the preset position by the storage conveyor through the feeder; starting a stepping motor of the pushing assembly to operate, and conveying the target tire pressure monitoring device with the packaging box to a preset position of the lower shielding box by the pushing assembly when the sensor including an optical fiber sensor detects that the target tire pressure monitoring device reaches the preset position;

triggering the stepping motors of the lower shielding box and the upper shielding box to operate when the fiber optic sensor detects that the target tire pressure monitoring device reaches the preset position; lifting the lower shielding box by the stepping motors through the screw lifting mechanism to close the lower shielding box and the upper shielding box; triggering a locking module to lock the target tire pressure monitoring device when a pressure sensor in the target tire pressure monitoring device detects the closing force generated by closing;

issuing a low frequency (LF) locking program command of the corresponding vehicle model by the locking module according to the locking mode and the vehicle model, and controlling the computer to confirm that the locking program is completed and starting the lower shielding box to perform resetting by the stepping motor when completion signals of the locking program issued by the target tire pressure monitoring device are received; after the optical fiber sensor detects the reset of the lower shielding box, starting the pushing assembly to push the next target tire pressure monitoring device into the preset position of the lower shielding box and push the locked target tire pressure monitoring device to the discharging port;

issuing, by the locking module, the coding program of the corresponding vehicle model when it is detected that the lock mode selected by the user is the second preset mode, and starting the lower shielding box to perform resetting by the stepping motor after the locking module receives the activation enable completion signals issued by the target tire pressure monitoring device, and conveying the target tire pressure monitoring device to a charging basket;

starting a target vehicle when it is detected that an unlocked target tire pressure monitoring device is mounted into the tire; activating the target tire pressure monitoring device when an acceleration sensor on a target vehicle detects the rotation of the tires of the target vehicle; and triggering the target tire pressure monitoring device to be locked when the pressure sensor detects the tire pressure.

\* \* \* \* \*